US010122947B2

(12) United States Patent
Ajito

(10) Patent No.: US 10,122,947 B2
(45) Date of Patent: Nov. 6, 2018

(54) IMAGE PICKUP APPARATUS AND IMAGE PROCESSING METHOD

(71) Applicant: Olympus Corporation, Hachioji-shi, Tokyo (JP)

(72) Inventor: Takeyuki Ajito, Hachioji (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 15/972,097

(22) Filed: May 4, 2018

(65) Prior Publication Data

US 2018/0255251 A1 Sep. 6, 2018

Related U.S. Application Data

(63) Continuation of application No. 15/349,572, filed on Nov. 11, 2016, now Pat. No. 9,998,690, which is a continuation of application No. PCT/JP2015/054416, filed on Feb. 18, 2015.

(30) Foreign Application Priority Data

May 29, 2014 (JP) ................................ 2014-111391

(51) Int. Cl.

| | |
|---|---|
| ***H04N 5/232*** | (2006.01) |
| ***H04N 9/64*** | (2006.01) |
| ***G06T 3/40*** | (2006.01) |
| ***H04N 5/349*** | (2011.01) |
| ***G06T 7/13*** | (2017.01) |
| ***H04N 9/04*** | (2006.01) |
| ***G03B 15/00*** | (2006.01) |
| ***G03B 7/091*** | (2006.01) |
| ***H04N 9/77*** | (2006.01) |

(52) U.S. Cl.

CPC ............ *H04N 5/349* (2013.01); *G03B 7/091* (2013.01); *G03B 15/00* (2013.01); *G06T 3/4015* (2013.01); *G06T 7/13* (2017.01); *H04N 5/23212* (2013.01); *H04N 5/23232* (2013.01); *H04N 5/23245* (2013.01); *H04N 9/045* (2013.01); *H04N 9/646* (2013.01); *H04N 9/77* (2013.01)

(58) Field of Classification Search

None

See application file for complete search history.

(56) References Cited

U.S. PATENT DOCUMENTS

2009/0160997 A1* 6/2009 Oyama ................ H04N 5/2254 348/340

* cited by examiner

*Primary Examiner* — Mark T Monk

(74) *Attorney, Agent, or Firm* — John C. Pokotylo; Pokotylo Patent Services

(57) ABSTRACT

An image pickup apparatus includes an image pickup device including a plurality of pixels arrayed at a predetermined pixel pitch, a shift mechanism configured to perform a pixel shift in a movement amount which is a non-integral multiple of the pixel pitch, a microcomputer configured to cause the image pickup device to pick up an image at pixel shifting positions to respectively acquire a plurality of pieces of image data, a synthesis processing section configured to synthesize the acquired plurality of pieces of image data to generate composite image data with a high resolution, and an image processing section configured to determine an edge enhancement parameter based on a characteristic relating to a pixel opening of the composite image data and perform edge enhancement processing for the composite image data.

4 Claims, 15 Drawing Sheets

SHOOTING
S21 PIXEL SHIFT SUPER-RESOLUTION MODE? No / Yes
SET CENTERING POSITION S23
CENTERING S24
SHOOT ONE IMAGE S25
SHOOT ONE IMAGE S22
S26 ENDED EIGHT TIMES? No / Yes
SYNTHESIS PROCESSING S27
SET IMAGE PROCESSING IDENTIFICATION INFORMATION S28
ADD TO Exif INFORMATION S29
RETURN

FIG. 6

| R | Gr |
|---|---|
| Gb | B |

FIG. 7

| (x1) | R1 | (x2) | R2 |
|---|---|---|---|
| R4 | | R3 | |
| (x3) | R5 | (x4) | R6 |
| R8 | | R7 | |

FIG. 8

| | | | |
|---|---|---|---|
| | Gr2 | | Gr1 |
| Gr3 | | Gr4 | |
| | Gr6 | | Gr5 |
| Gr7 | | Gr8 | |

FIG. 9

| | | | |
|---|---|---|---|
| | Gb5 | | Gb6 |
| Gb8 | | Gb7 | |
| | Gb1 | | Gb2 |
| Gb4 | | Gb3 | |

FIG. 10

| | | | |
|---|---|---|---|
| | B6 | | B5 |
| B7 | (y1) | B8 | (y2) |
| | B2 | | B1 |
| B3 | (y3) | B4 | (y4) |

FIG. 11

| | | | |
|---|---|---|---|
| R'1 | G'1 | R'2 | G'2 |
| G'3 | B'1 | G'4 | B'2 |
| R'3 | G'5 | R'4 | G'6 |
| G'7 | B'3 | G'8 | B'4 |

| SHOOTING MODE | NORMAL | PIXEL SHIFT SUPER-RESOLUTION IMAGE |
|---|---|---|
| SAMPLING PITCH | 3.85 μm | 1.92 μm |
| PIXEL OPENING RATIO | 75% | 150% |
| PIXEL OPENING MTF [0.3 (LINES PER NUMBER OF PIXELS)] | 0.9 | 0.7 |
| EDGE ENHANCEMENT PARAMETER | $\alpha=0.1$ | $\alpha=0.45$ |

IMAGE PICKUP APPARATUS AND IMAGE PROCESSING METHOD

CROSS REFERENCE TO RELATED APPLICATIONS

This application is a continuation application of U.S. patent application Ser. No. 15/349,572 (referred to as "the '572 application" and incorporated herein by reference), filed on Nov. 11, 2016, titled "IMAGE PICKUP APPARATUS AND IMAGE PROCESSING METHOD" and listing Takeyuki AJITO as the inventor, the '572 application being a continuation application of PCT/JP2015/054416 (incorporated herein by reference) filed on Feb. 18, 2015 and claims benefit of Japanese Application No. 2014-111391 filed in Japan on May 29, 2014, the entire contents of which are incorporated herein by this reference.

BACKGROUND OF THE INVENTION

1. Field of the Invention

The present invention relates to an image pickup apparatus which synthesizes a plurality of pieces of image data acquired by performing a pixel shift in a movement amount which is less than a pixel pitch to generate an image with a high resolution, and an image processing method.

2. Description of the Related Art

Conventionally, an image pickup apparatus which moves a relative position between an image pickup device and a light flux received by the image pickup device in a movement amount, which is less than a pixel pitch in the image pickup device, to perform image pickup and synthesizes an acquired plurality of pieces of image data to generate an image with a higher resolution has been known.

Japanese Patent Application Laid-Open Publication No. 7-240870, for example, discusses a technique for displacing a relative position between an object image formed by a shooting optical system and an image pickup device by a ½ pixel pitch in a horizontal direction and/or a vertical direction by bending with a variable angle prism and synthesizing a plurality of pieces of image data acquired at the displaced position to generate an image with a high resolution.

Japanese Patent Application Laid-Open Publication No. 6-225317 discusses a technique for shifting an image pickup device by one pixel pitch in a horizontal or vertical direction and by a ½ pixel pitch in an oblique direction by a piezoelectric element to perform image pickup at respective pixel shifting positions and synthesizing an acquired plurality of images to generate an image with a high resolution.

However, in recent years, a technique for manufacturing an image pickup device has been advanced so that a pixel opening ratio has been improved. For example, a pixel opening ratio in which a pixel opening width exceeds 50% of a pixel pitch has also been proposed.

SUMMARY OF THE INVENTION

According to an aspect of the present invention, an image pickup apparatus includes an image pickup device including a plurality of pixels arrayed in a two-dimensional form at a predetermined pixel pitch, a pixel shift section configured to perform a pixel shift so that a relative position in a direction of the array in the two-dimensional form between the image pickup device and a light flux received by the image pickup device becomes a plurality of relative positions, which differ in movement amounts, including a relative position in a movement amount which is a non-integral multiple of the pixel pitch, an image pickup control section configured to cause the image pickup device to perform an image pickup operation at the plurality of respective relative positions to acquire a plurality of pieces of image data, an image synthesis section configured to synthesize the plurality of pieces of image data acquired by the image pickup control section, to generate composite image data with a higher resolution than resolution of image data obtained from the image pickup device, and an image processing section configured to determine an edge enhancement parameter based on a characteristic relating to a pixel opening of the composite image data and perform edge enhancement processing for the composite image data using the determined edge enhancement parameter.

According to another aspect of the present invention, an image processing method for performing a pixel shift so that a relative position between an image pickup device including a plurality of pixels arrayed in a two-dimensional form at a predetermined pixel pitch and a light flux received by the image pickup device in a direction of the array in the two-dimensional form becomes a plurality of relative positions, which differ in movement amounts, including a relative position in a movement amount which is a non-integral multiple of the pixel pitch, and processing a plurality of pieces of image data acquired by causing the image pickup device to perform an image pickup operation at the plurality of respective relative positions further includes synthesizing the plurality of pieces of image data, to generate composite image data with a higher resolution than resolution of image data obtained from the image pickup device, determining an edge enhancement parameter based on a characteristic relating to a pixel opening of the composite image data, and performing edge enhancement processing for the composite image data using the determined edge enhancement parameter.

BRIEF DESCRIPTION OF THE DRAWINGS

FIG. 6 is a diagram illustrating a basic pixel arrangement of R, Gr, Gb, and B pixels in a Bayer image obtained from the image pickup device by shooting in the embodiment 1;

FIG. 7 is a diagram illustrating an R pixel arrangement obtained by a pixel arrangement section from the pixel arrangement illustrated in FIG. 6 corresponding to eight Bayer images in the embodiment 1;

FIG. 8 is a diagram illustrating a Gr pixel arrangement obtained by the pixel arrangement section from the pixel arrangement illustrated in FIG. 6 corresponding to eight Bayer images in the embodiment 1;

FIG. 9 is a diagram illustrating a Gb pixel arrangement obtained by the pixel arrangement section from the pixel arrangement illustrated in FIG. 6 corresponding to eight Bayer images in the embodiment 1;

FIG. 10 is a diagram illustrating a B pixel arrangement obtained by the pixel arrangement section from the pixel arrangement illustrated in FIG. 6 corresponding to eight Bayer images in the embodiment 1;

FIG. 11 is a diagram illustrating a pixel arrangement in a Bayer image with a high resolution obtained as a result of synthesis by the synthesis processing section in the embodiment 1;

DETAILED DESCRIPTION OF THE PREFERRED EMBODIMENTS

Embodiments of the present invention will be described below with reference to the drawings.

Embodiment 1

Figure 1:
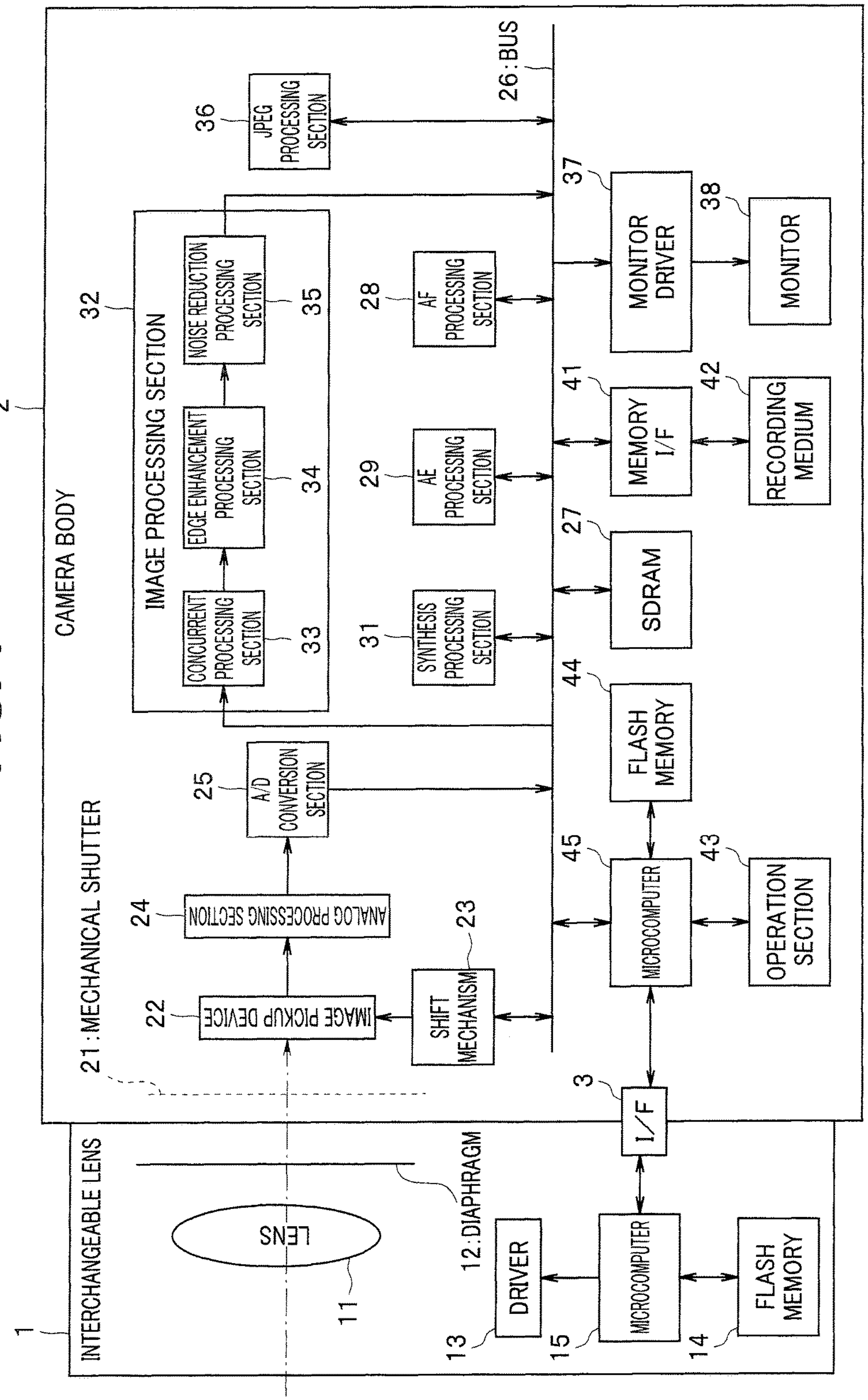
FIG. 1 is a block diagram illustrating a configuration of a digital camera in an embodiment 1 of the present invention.

FIGS. 1 to 21 illustrate an embodiment 1 of the present invention, where FIG. 1 is a block diagram illustrating a configuration of a digital camera.

A digital camera serving as an image pickup apparatus is configured by communicably connecting an interchangeable lens 1 and a camera body 2 via an interface (I/F) 3.

The interchangeable lens 1 is removably mounted on the camera body 2 via a lens mount, for example, and an electric contact formed in the lens mount (an electric contact provided on the side of the interchangeable lens 1 and an electric contact provided on the side of the camera body 2), for example, constitutes an interface 3. Thus, the interchangeable lens 1 is communicable with the camera body 2 via the interface 3.

The interchangeable lens 1 includes a lens 11, a diaphragm 12, a driver 13, a flash memory 14, and a microcomputer 15.

The lens 11 is a shooting optical system for forming an optical image of an object on an image pickup device 22, described below, in the camera body 2.

The diaphragm 12 is an optical diaphragm configured to control a passage range of a light flux passing through the lens 11.

The driver 13 drives the lens 11 to adjust a focus position based on an instruction from the microcomputer 15, and also further changes a focal length if the lens 11 is a power zoom lens, for example. In addition, the driver 13 drives the diaphragm 12 to change an opening size based on the instruction from the microcomputer 15. By the driving of the diaphragm 12, the brightness of the optical image of the object changes, and the amount of defocus, for example, also changes.

The flash memory 14 is a storage medium configured to store a control program executed by the microcomputer 15 and various types of information relating to the interchangeable lens 1.

The microcomputer 15 is a so-called lens-side computer, and is connected to the driver 13, the flash memory 14, and the interface 3. The microcomputer 15 communicates with a microcomputer 45 serving as a body-side computer, described below, via the interface 3, and reads/writes information stored in the flash memory 14 upon receiving an instruction from the microcomputer 45, to control the driver 13. Further, the microcomputer 15 transmits various types of information relating to the interchangeable lens 1 to the microcomputer 45.

The interface 3 connects the microcomputer 15 in the interchangeable lens 1 and the microcomputer 45 in the camera body 2 to be bidirectionally communicable.

Then, the camera body 2 includes a mechanical shutter 21, the image pickup device 22, a shift mechanism 23, an analog processing section 24, an analog/digital conversion section (A/D conversion section) 25, a bus 26, an SDRAM (synchronous dynamic random access memory) 27, an AF (autofocus) processing section 28, an AE (automatic exposure) processing section 29, a synthesis processing section 31, an image processing section 32, a JPEG (joint photographic experts group) processing section 36, a monitor driver 37, a monitor 38, a memory interface (memory I/F) 41, a recording medium 42, an operation section 43, a flash memory 44, and the microcomputer 45.

The mechanical shutter 21 is a mechanical shutter configured to control a period of time required for the light flux from the lens 11 to reach the image pickup device 22 and travel a shutter blade, for example. The mechanical shutter 21 is driven under the instruction from the microcomputer 45, to control a period of time required for the light flux to reach the image pickup device 22, i.e., a period of time required for the image pickup device 22 to expose the object.

The image pickup device 22 photoelectrically converts an optical image of the object having a plurality of pixels arrayed in a two-dimensional form at a predetermined pixel pitch (see a pixel pitch P illustrated in FIG. 4) and formed via the lens 11 and the diaphragm 12, to generate an analog image signal. The image pickup device 22 is configured by arranging color filters in a plurality of colors including a luminance corresponding color (e.g., green) so that one color corresponds to one pixel, and is more specifically configured as a single image pickup device in which color filters in a primary color Bayer array are respectively arranged on front surfaces of the plurality of pixels arrayed in a vertical direction and a horizontal direction (see FIG. 6). Note that the image pickup device 22 is, of course, not limited to the single image pickup device, and may be a laminated image pickup device configured to separate color components in a substrate thickness direction, for example.

The shift mechanism 23 is a pixel shift section configured to perform a pixel shift so that a relative position in a direction of the aforementioned array in the two-dimensional form between the image pickup device 22 and the light flux received by the image pickup device 22 becomes a plurality of relative positions, which differ in movement amounts, including a relative position in a movement amount which is a non-integral multiple of the pixel pitch. More specifically, the shift mechanism 23 moves the image pickup device 22 in a plane perpendicular to an optical axis of the lens 11 using a driving source such as a voice coil motor (VCM) or a piezoelectric element. In the present embodiment, the shift mechanism 23 is used to move the image pickup device 22 by half pixel pitch, for example, when a plurality of images are picked up to obtain a composite image with a higher resolution than the resolution of image data obtained from the image pickup device 22.

Note that, while the shift mechanism 23 moves the image pickup device 22, the lens 11 may be moved, or both the image pickup device 22 and the lens 11 may be moved instead of this. In other words, the relative position between the image pickup device 22 and the received light flux may be changeable.

The analog processing section 24 shapes a waveform after reducing reset noise or the like for an analog image signal read out of the image pickup device 22, and further performs gain-up to obtain a target brightness.

The A/D conversion section 25 converts the analog image signal outputted from the analog processing section 24 into a digital image signal (hereinafter referred to as image data, for example).

The bus 26 is a transfer path for transferring various types of data and control signals, which have been generated in a location in the digital camera, to other locations in the digital camera. The bus 26 in the present embodiment is connected to the shift mechanism 23, the A/D conversion section 25, the SDRAM 27, the AF processing section 28, the AE processing section 29, the synthesis processing section 31, the image processing section 32, the JPEG processing section 36, the monitor driver 37, the memory I/F 41, and the microcomputer 45.

The image data (hereinafter referred to as RAW image data, as needed) outputted from the A/D conversion section 25 is transferred via the bus 26, and is stored once in the SDRAM 27.

The SDRAM 27 is a storage section configured to temporarily store the aforementioned RAW image data or various types of data such as image data processed in the synthesis processing section 31, the image processing section 32, the JPEG processing section 36, and the like.

The AF processing section 28 extracts a signal having a high frequency component from the RAW image data, and acquires an in-focus evaluation value by AF (autofocus) integration processing. The acquired in-focus evaluation value is used for AF driving of the lens 11. Note that AF is, of course, not limited to such contrast AF. The AF processing section 28 may be configured to perform phase difference AF using a dedicated AF sensor (or pixels for AF on the image pickup device 22), for example.

The AE processing section 29 calculates the luminance of the object based on the RAW image data. The calculated luminance of the object is used for automatic exposure (AE) control, i.e., control of the diaphragm 12, control of the mechanical shutter 21, control of an exposure timing of the image pickup device 22 (or control of a so-called device shutter), and the like. Note that the RAW image data is used as data for calculating the luminance of the object. However, instead of this, data obtained by providing a dedicated photometry sensor in the digital camera may be utilized.

The synthesis processing section 31 is an image synthesis section configured to synthesize a plurality of pieces of image data acquired by control of the microcomputer 45 serving as an image pickup control section (a plurality of pieces of image data picked up by the shift mechanism 23 moving the image pickup device 22), to generate composite image data with a higher resolution (hereinafter referred to as a super-resolution image, for example, as needed) than the image data obtained from the image pickup device 22.

The image processing section 32 performs various types of image processing for the RAW image data (normal image data) obtained from the image pickup device 22 or the composite image data obtained as a result of the synthesis by the synthesis processing section 31, and includes a concurrent processing section 33, an edge enhancement processing section 34, and a noise reduction processing section 35.

The concurrent processing section 33 performs concurrent processing for converting image data in a Bayer array in which only one of three RGB color components exists per pixel into image data in which each of all pixels includes three RGB color components by finding a color component not existing in a target pixel by interpolation from peripheral pixels.

The edge enhancement processing section 34 determines an edge enhancement parameter based on a characteristic relating to a pixel opening of image data (normal image data or composite image data) (e.g., a pixel opening ratio or a pixel opening MTF (modulation transfer function) characteristic, described below), and performs edge enhancement processing for the image data (the normal image data or the composite image data) using the determined edge enhancement parameter. The edge enhancement processing performed by the edge enhancement processing section 34 will be specifically described below with reference to FIG. 14.

The noise reduction processing section 35 performs noise reduction processing by performing processing such as coring processing depending on a frequency for the image data.

Thus, the image data, which has been subjected to the various types of image processing by the image processing section 32, is stored in the SDRAM 27 again.

The JPEG processing section 36 reads out the image data from the SDRAM 27, compresses the read image data according to a JPEG compression method, and stores the compressed image data once in the SDRAM 27 when the image data is recorded. Thus, the compressed image data, which has been stored in the SDRAM 27, is prepared as recording data after the microcomputer 45 adds a header required to constitute a file to the image data. The prepared recording data is recorded on the recording medium 42 via the memory I/F 41 based on the control of the microcomputer 45.

The JPEG processing section 36 also decompresses the read image data. That is, when the recorded image is reproduced, a JPEG file, for example, is read out of the recording medium 42 via the memory I/F 41 based on the control of the microcomputer 45, and is stored once in the SDRAM 27. The JPEG processing section 36 reads out JPEG image data stored in the SDRAM 27, decompresses the read JPEG image data according to a JPEG decompression method, and stores the decompressed image data in the SDRAM 27.

The monitor driver 37 reads out the image data stored in the SDRAM 27, converts the read image data into a video signal, controls driving of the monitor 38, and displays an image based on the video signal on the monitor 38. The image display performed by the monitor driver 37 includes REC view display for displaying image data immediately after shooting for only a short period of time, reproduction display of the JPEG file recorded on the recording medium 42, and live view display.

The monitor 38 displays an image while displaying various types of information relating to the digital camera by driving control of the monitor driver 37, as described above.

The memory I/F 41 writes image data into the recording medium 42 and reads out image data from the recording medium 42, as described above.

The recording medium 42 stores image data in a nonvolatile manner, and includes a memory card which can be removably mounted on the camera body 2, for example. However, the recording medium 42 is not limited to the memory card. The recording medium 42 may be a disk-shaped recording medium, or may be any other recording media. Thus, the recording medium 42 need not be a component specific to the digital camera.

The operation section 43 is for performing various types of operation inputs to the digital camera, and includes a power button configured to turn on/off the power to the digital camera, a release button composed of a two-stage operation button including a 1st (first) release switch and a 2nd (second) release switch, for example, configured to issue an instruction to start to shoot an image, a reproduction button configured to reproduce a recorded image, a menu button configured to make a setting of the digital camera, for example, operation buttons such as an arrow key used for a selection operation of an item and an OK button used for a finalization operation of the selected item, and the like. Items, which are settable using the menu button and the arrow key, the OK button, and the like include a shooting mode (a normal shooting mode, a pixel shift super-resolution shooting mode, etc.) and a recording mode (a JPEG recording mode, an RAW+JPEG recording mode, etc.). When an operation is performed for the operation section 43, a signal corresponding to an operation content is outputted to the microcomputer 45.

The flash memory 44 is a storage medium configured to store a processing program executed by the microcomputer 45 and various types of information relating to the digital camera in a nonvolatile manner. Some examples of the information stored by the flash memory 44 include various types of parameters required for an operation of the digital camera, such as an edge enhancement parameter corresponding to a characteristic relating to a pixel opening of image data, information such as a magnitude, a direction, and an order of a pixel shift in a pixel shift super-resolution shooting mode, and a manufacturing number for specifying the digital camera. The microcomputer 45 reads the information stored in the flash memory 44.

The microcomputer 45 is a control section configured to control each of the sections in the camera body 2 while transmitting an instruction to the microcomputer 15 via the interface 3 to control the interchangeable lens 1 and to integrally control the digital camera. The microcomputer 45 reads the parameters required for processing from the flash memory 44 according to the processing program stored in the flash memory 44 when a user performs an operation input from the operation section 43, and executes various types of sequences corresponding to an operation content. The microcomputer 45 also functions as an image pickup control section configured to cause the image pickup device 22 to perform an image pickup operation at each of the plurality of relative positions where the aforementioned shift mechanism 23 has performed the pixel shift, to acquire a plurality of pieces of image data. Further, the microcomputer 45 also functions as an image recording section configured to record a characteristic relating to a pixel opening of composite image data (e.g., a pixel opening ratio or a pixel opening MTF characteristic, described below) in relation to composite image data via the memory I/F 41.

Figure 2:
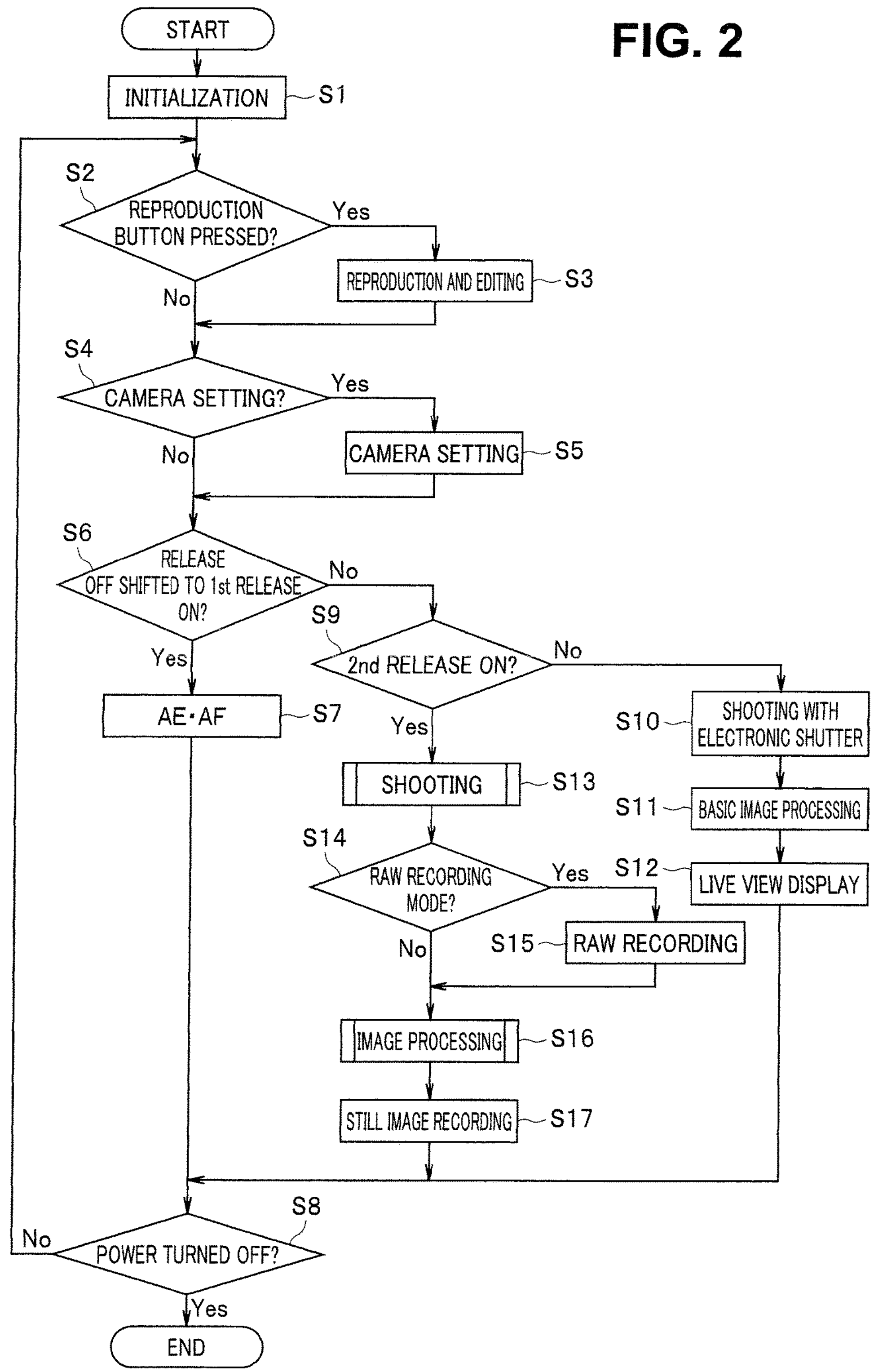
FIG. 2 is a flowchart illustrating the flow of main processing in the digital camera in the embodiment 1.

Then, FIG. 2 is a flowchart illustrating the flow of main processing in the digital camera. The processing illustrated in FIG. 2 is performed based on the control of the microcomputer 45.

When the power button in the operation section 43 is on-operated so that the power to the digital camera is turned on, the main processing is started. First, the digital camera is initialized (step S1).

Then, the microcomputer 45 judges whether the reproduction button in the operation section 43 has been operated (step S2).

If the reproduction button has been operated, reproduction and editing processing is performed (step S3). The reproduction and editing processing is processing for displaying a list of files recorded on the recording medium 42 and waiting for a selection operation from a user, to reproduce the file selected and determined and edit a selected image.

If the reproduction button has not been operated in step S2, or a process in step S3 has been performed, the menu button in the operation section 43 is operated. The microcomputer 45 judges whether a camera setting relating to the digital camera has been selected (step S4).

If the camera setting has been selected, the microcomputer 45 displays a menu for changing the camera setting on the monitor 38, and waits until a user operation for changing the camera setting is performed from the operation section 43. Some examples of the camera setting include the following modes, as described above:

shooting mode: a normal shooting mode and a pixel shift super-resolution shooting mode recording mode: a JPEG recording mode and an RAW+JPEG recording mode However, the present invention is not limited to the modes.

If the user operation has been performed, the camera setting depending on an operation content is made (step S5).

If the camera setting has not been selected in step S4, or a process in step S5 has been performed, the microcomputer 45 judges whether the release button has shifted from an off state to a 1st release on state serving as a press state in a first stage (a so-called half press state) (step S6).

If the release button has shifted to the 1st release on state, automatic exposure (AE) control for shooting an image is performed by the AE processing section 29 while automatic focus control (AF) is performed by the AF processing section 28 at a timing of the shift (step S7). Thus, so-called AE locking and AF locking are performed after turning to the 1st release on state.

The microcomputer 45 judges whether the power button has been off-operated (step S8). If the off-operation has not been performed, the processing returns to step S2. In step S2, the microcomputer 45 repeatedly performs the aforementioned processing.

If the release button has not shifted to the 1st release on state in step S6, described above, the microcomputer 45 judges whether the release button has been in a 2nd release on state serving as a press state in a second stage (a so-called full press state) (step S9).

If the release button has not been in the 2nd release on state, based on the control of the microcomputer 45, the mechanical shutter is opened and automatic exposure (AE) control for a live view is performed the AE processing section 29 and shooting images corresponding to one frame (or one field, etc.) using an electronic shutter is performed (step S10).

Basic image processing from which some of the image processes to be performed for a recorded image have been omitted, for example, for the image thus shot is performed (step S11), and a frame image obtained by the basic image processing as one frame of the live view is displayed on the monitor 38 (step S12).

Then, the processing proceeds to step S8, described above. In step S8, the microcomputer 45 judges whether the power button has been off-operated. If the off-operation has not been performed, the processing returns to step S2, and the microcomputer 45 respectively performs the aforementioned processing.

Figure 3:
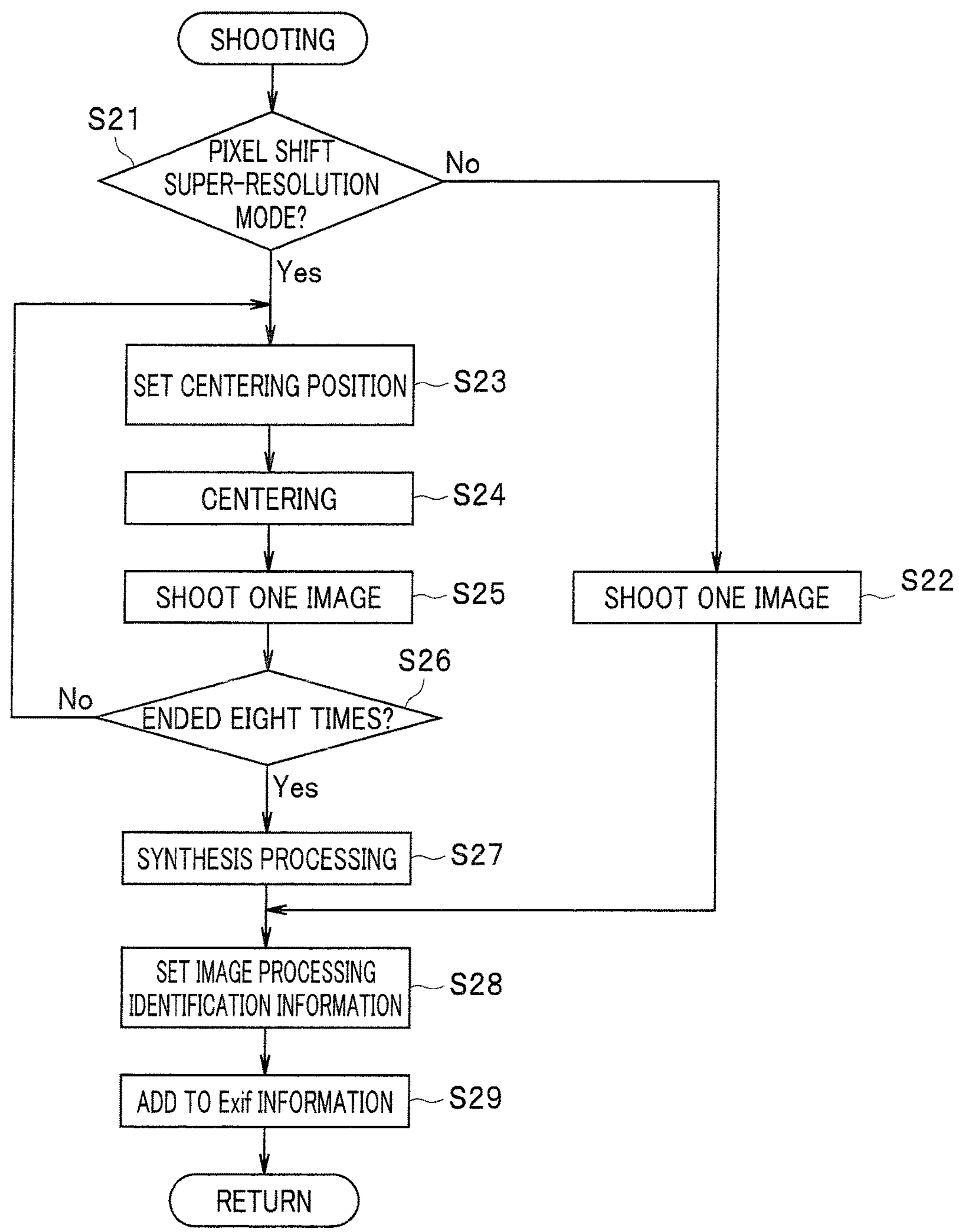
FIG. 3 is a flowchart illustrating the flow of shooting processing in the digital camera in the embodiment 1.

On the other hand, if the release button has been in the 2nd release on state in step S9, described above, shooting processing which will be described below with reference to FIG. 3 is performed (step S13).

Then, the microcomputer 45 judges whether a RAW recording mode has been set (step S14). If the RAW recording mode has been set, a RAW image is recorded on the recording medium 42 (step S15).

Figures 12, 13:
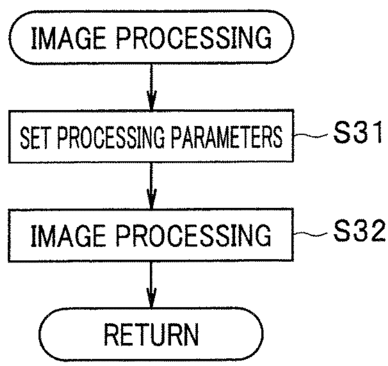
FIG. 12 is a flowchart illustrating the flow of image processing in the digital camera in the embodiment 1.
FIG. 13 is a chart illustrating an example in which an edge enhancement parameter is determined depending on a characteristic relating to a pixel opening of composite image data in the embodiment 1.

If the RAW recording mode has not been set in step S14, or a process in step S15 has been performed, image processing, as described below with reference to FIG. 12, is performed for an image obtained by shooting (step S16).

Then, the image, which has been subjected to the image processing is compressed, using JPEG, and records the image as a JPEG file is recorded on the recording medium 42 after added with a header including Exif information to the image (step S17).

If a process in step S17 has been performed, the processing proceeds to a process in step S8, described above. In step S8, the microcomputer 45 judges whether the power button has been off-operated.

Thus, if the off operation has been performed in step S8, the main processing ends.

FIG. 3 is a flowchart illustrating the flow of the shooting processing in the digital camera.

When the processing is started, the microcomputer 45 judges whether the shooting mode has been set to the pixel shift super-resolution shooting mode (step S21).

If the shooting mode has not been set to the pixel shift super-resolution shooting mode, normal shooting processing for shooting one image is performed by driving the diaphragm 12, opening the mechanical shutter 21, and causing the image pickup device 22 to perform exposure (step S22).

If the shooting mode has been set to the pixel shift super-resolution shooting mode, a centering position of the image pickup device 22 is set in the plane perpendicular to the optical axis of the lens 11 (in a direction of an array surface in a two-dimensional form of the plurality of pixels in the image pickup device 22) (step S23), and the shift mechanism 23 moves the image pickup device 22 to the set centering position (step S24).

Figure 4:
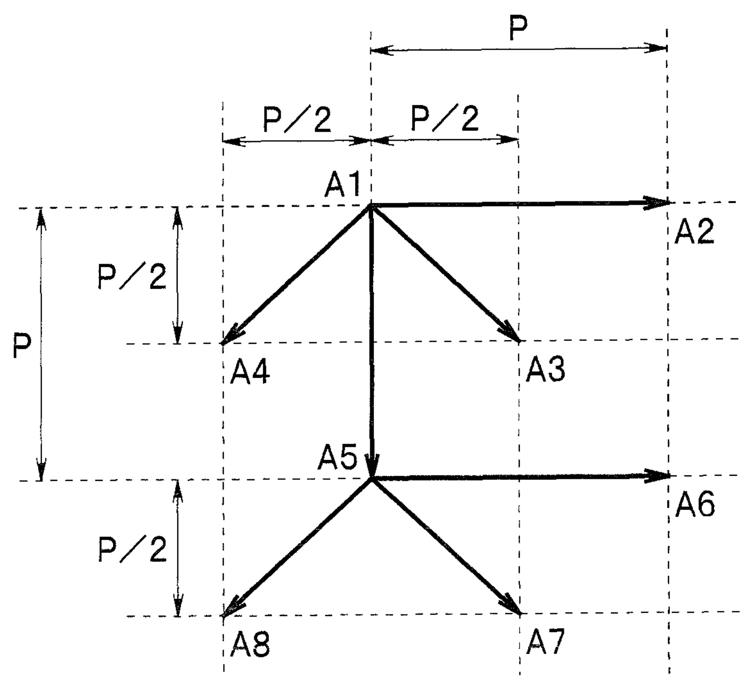
FIG. 4 is a diagram illustrating an example of a centering position of an image pickup device which is moved by a shift mechanism in the embodiment 1.

FIG. 4 is a diagram illustrating an example of a centering position of the image pickup device 22 which is moved by the shift mechanism 23.

In the present embodiment, the image pickup device 22 is moved from a central position to, for example, eight different centering positions, including different centering positions which are non-integral multiples of a pixel pitch, picks up an image at each of the centering positions, and synthesizes the eight images obtained by the image pickup, to acquire one super-resolution image.

Letting P be a pixel pitch, a centering position A2 is a position obtained by shifting a centering position A1 rightward by 1P, a centering position A3 is a position obtained by shifting the centering position A1 rightward by (½)P and downward by (½)P, a centering position A4 is a position obtained by shifting the centering position A1 leftward by (½)P and downward by (½)P, a centering position A5 is a position obtained by shifting the centering position A1 downward by 1P, a centering position A6 is a position obtained by shifting the centering position A1 rightward by 1P and downward by 1P, a centering position A7 is a position obtained by shifting the centering position A1 rightward by (½)P and downward by (3/2)P, and a centering position A8 is a position obtained by shifting the centering position A1 leftward by (½)P and downward by (3/2)P.

Therefore, while the centering positions A3, A4, A7, and A8 are respective relative positions in movement amounts which are ½ or 3/2 times (i.e., a non-integral multiple) of the pixel pitch with respect to the centering position A1, the centering positions A2, A5, and A6 are relative positions in a movement amount which is one time (i.e., an integral multiple) of the pixel pitch. While the centering position thus needs to include at least one of relative positions in movement amounts which are non-integral multiples of the pixel pitch, the centering position may further include a relative position in a movement amount which is an integral multiple of the pixel pitch if the condition is satisfied.

When the shift mechanism 23 performs a pixel shift, as illustrated in FIG. 4, for the image pickup device 22 in a primary color Bayer array, a plurality of relative positions are set so that respective positions of different pixels corresponding to a color filter in a luminance corresponding color (in this case, green) overlap each other at at least two of the plurality of relative positions (i.e., a pixel in the luminance corresponding color at a centering position and the other pixel in the luminance corresponding color at the other centering position positionally overlap each other) (see FIGS. 8 and 9).

However, the centering positions illustrated in FIG. 4 are examples. Note that other arrangements and centering positions the number of which is other than eight may, of course, be adopted.

One image is shot by driving the diaphragm 12, opening the mechanical shutter 21, and causing the image pickup device 22 to perform exposure at the centering position to which the image pickup device 22 has moved (step S25).

Then, the microcomputer 45 judges whether processing at the eight centering positions A1 to A8, as illustrated in FIG. 4, has all ended (step S26). If the processing has not ended, the processing returns to step S23. In step S23, processing at the subsequent centering position is performed.

If the processing at all the centering positions has thus ended in step S26, the synthesis processing section 31 synthesizes eight images obtained by the shooting, to generate one super-resolution image (step S27).

If a process in step S27 or the aforementioned process in step S22 ends, the microcomputer 45 sets image processing identification information indicating that the image is a super-resolution image for the super-resolution image obtained in step S27, and sets image processing identification information indicating that the image is a normal image for the image obtained in step S22 (step S28), and adds the set image processing identification information to Exif information (step S29). The processing returns to the processing illustrated in FIG. 2.

Note that examples of the image processing identification information include information indicating whether an image has been shot in a pixel shift super-resolution shooting mode, information representing a relative relationship between a pixel opening ratio and a sampling pitch, and an edge enhancement degree determined based on a pixel opening MTF. The Exif information is incorporated into a header of an image file and is recorded on the recording medium 42 in the process in step S17 illustrated in FIG. 2, described above.

Figure 5:
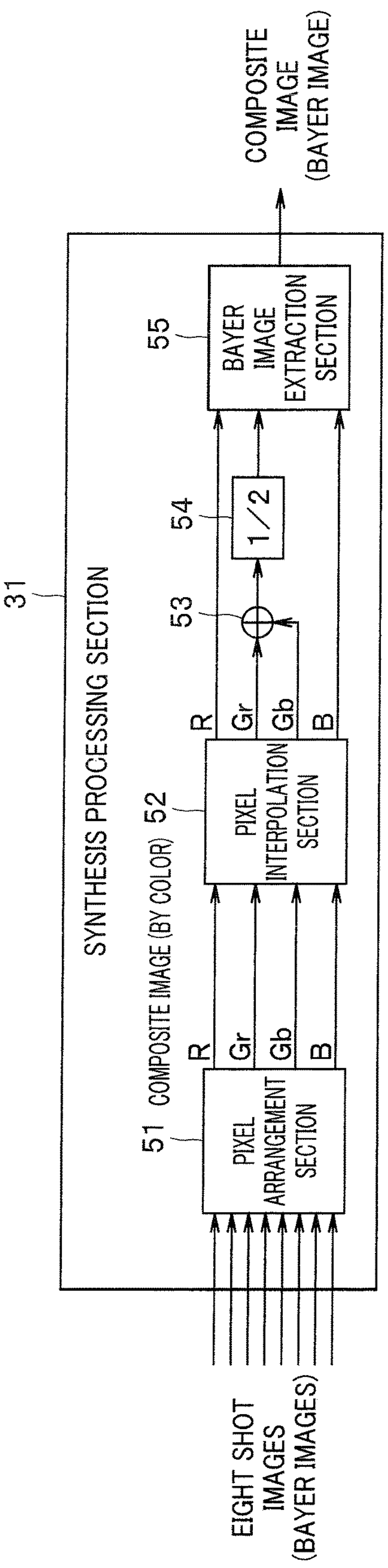
FIG. 5 is a block diagram illustrating a configuration of a synthesis processing section in the embodiment 1.

Then, FIG. 5 is a block diagram illustrating a configuration of the synthesis processing section 31.

The synthesis processing section 31 includes a pixel arrangement section 51, a pixel interpolation section 52, an addition section 53, a half-value section 54, and a Bayer image extraction section 55.

The pixel arrangement section 51 separates each of eight Bayer images (RAW images) acquired in a pixel shift super-resolution shooting mode into an R component, a Gr component, a Gb component, and a B component, and respectively arranges the R components, the Gr components, the Gb components, and the B components depending on centering positions A1 to A8.

FIG. 6 is a diagram illustrating a basic pixel arrangement of R, Gr, Gb, and B pixels in a Bayer image obtained from the image pickup device 22 by shooting, FIG. 7 is a diagram illustrating an R pixel arrangement obtained by the pixel arrangement section 51 from the pixel arrangement illustrated in FIG. 6 corresponding to the eight Bayer images, FIG. 8 is a diagram illustrating a Gr pixel arrangement obtained by the pixel arrangement section 51 from the pixel arrangement illustrated in FIG. 6 corresponding to the eight Bayer images, FIG. 9 is a diagram illustrating a Gb pixel arrangement obtained by the pixel arrangement section 51 from the pixel arrangement illustrated in FIG. 6 corresponding to the eight Bayer images, and FIG. 10 is a diagram illustrating a B pixel arrangement obtained by the pixel arrangement section 51 from the pixel arrangement illustrated in FIG. 6 corresponding to the eight Bayer images.

The pixel arrangement section 51 respectively extracts the R components from the eight Bayer images constructed by repeating the basic pixel arrangement as illustrated in FIG. 6 and rearranges the R components depending on the centering positions A1 to A8 illustrated in FIG. 4, and generates an R composite image in a pixel arrangement where R1 to R8 pixels are arranged in a 4×4 pixel array as illustrated in FIG. 7. Similarly, the pixel arrangement section 51 respectively extracts the Gr components, the Gb components, and the B components from the eight Bayer images and rearranges the Gr components, the Gb components, and the B components depending on the centering positions A1 to A8, and respectively generates a Gr composite image, a Gb composite image, and B composite image in pixel arrangements illustrated in FIGS. 8, 9, and 10, respectively.

The pixel interpolation section 52 respectively interpolates pixels at x1 to x4 pixel positions illustrated in FIG. 7 based on peripheral R pixels, to obtain R'1 to R'4 pixels. Similarly, the pixel interpolation section 52 respectively interpolates pixels at y1 to y4 pixel positions illustrated in FIG. 10 based on peripheral B pixels, to obtain B'1 to B'4 pixels.

The pixel interpolation by the pixel interpolation section 52 can be expressed by the following equations 1 and 2 when the interpolation is performed based on four peripheral pixels, for example:

$$R'1=(R1+R4+(\text{upper } R8)+(\text{left } R2))/4$$

$$R'2=(R1+R2+R3+(\text{upper } R7))/4$$

$$R'3=(R4+R5+R8+(\text{left } R6))/4$$

$$R'4=(R3+R5+R6+R7)/4 \quad \text{[Equation 1]}$$

$$B'1=(B6+B7+B8+B2)/4$$

$$B'2=(B5+B8+B1+(\text{right } B7))/4$$

$$B'3=(B2+B3+B4+(\text{lower } B6))/4$$

$$B'4=(B1+B4+(\text{right } B3)+(\text{lower } B5))/4 \quad \text{[Equation 2]}$$

In the equations 1 and 2, “upper”, “left”, “right”, and “lower” respectively represent a 4×4 pixel array positioned on the upper side, a 4×4 pixel array positioned on the left side, a 4×4 pixel array positioned on the right side, and a 4×4 pixel array positioned on the lower side in the 4×4 pixel array illustrated in FIG. 7 or 10.

The addition section 53 adds the Gr composite image illustrated in FIG. 8 and the Gb composite image illustrated in FIG. 9, respectively, at corresponding pixel positions.

The half-value section 54 divides a GrGb composite image obtained as a result of the addition by the addition section 53 by two.

That is, the addition section 53 and the half-value section 54 average the Gr composite image illustrated in FIG. 8 and the Gb composite image illustrated in FIG. 9. The averaging processing can be expressed by the following equation 3:

$$G'1=(Gr2+Gb5)/2$$

$$G'2=(Gr1+Gb6)/2$$

$$G'3=(Gr3+Gb8)/2$$

$$G'4=(Gr4+Gb7)/2$$

$$G'S=(Gr6+Gb1)/2$$

$$G'6=(Gr5+Gb2)/2$$

$$G'7=(Gr7+Gb4)/2$$

$$G'8=(Gr8+Gb3)/2 \quad \text{[Equation 3]}$$

Thus, the synthesis processing section 31 averages a plurality of pieces of pixel data in a luminance corresponding color (in this case, green) acquired at overlapping positions to obtain pixel data after synthesis at the overlapping positions, to achieve noise reduction and image quality enhancement.

The Bayer image extraction section 55 synthesizes the R'1 to R'4 pixels and the B'1 to B'4 pixels obtained as a result of the interpolation by the pixel interpolation section 52 and the GrGb composite image after the averaging outputted from the half-value section 54 as one Bayer image with a high resolution, and outputs the Bayer image.

FIG. 11 is a diagram illustrating a pixel arrangement of the Bayer image with a high resolution obtained as a result of the synthesis by the synthesis processing section 31.

As can be seen from comparison between FIG. 11 and FIG. 6, in the pixel shift super-resolution shooting mode, a super-resolution image with a resolution, which is two times in a horizontal direction and two times in a vertical direction the resolution of the Bayer image illustrated in FIG. 6, is obtained in FIG. 11.

Then, FIG. 12 is a flowchart illustrating the flow of image processing in the digital camera.

When the processing is started, the microcomputer 45 reads out a parameter used for image processing from the flash memory 44, and sets the parameter in the image processing section 32 (step S31). The parameter set in step S31 includes an edge enhancement parameter corresponding to a characteristic relating to a pixel opening of image data (a pixel opening ratio, a pixel opening MTF characteristic, etc.), as described above. Note that the pixel opening ratio or the pixel opening MTF characteristic has a value determined depending on whether a shooting mode is a normal shooting mode or a pixel shift super-resolution shooting mode. Therefore, in practice, the edge enhancement parameter may be set depending on the shooting mode (see FIG. 13).

The image processing section 32 performs image processing based on the set parameter (step S32).

The image processing includes the following processing.

First, the concurrent processing section 33 performs concurrent processing for finding a color component not existing in a target pixel by interpolation from peripheral pixels from image data in a Bayer array in which only one of three RGB color components exists per pixel, to convert the image data into image data in which each of all pixels includes three RGB color components.

Then, the edge enhancement processing section 34 performs edge enhancement processing by extracting an edge component from the image data using a bandpass filter, multiplying the extracted edge component by a coefficient (an edge enhancement parameter) corresponding to an edge enhancement degree, and adding a multiplication result to the original image data.

Furthermore, the noise reduction processing section 35 performs noise reduction processing by frequency resolving image data and performing coring processing depending on a frequency.

If the image processing in step S32 has been thus performed, the processing returns to the processing illustrated in FIG. 2.

Figure 14:
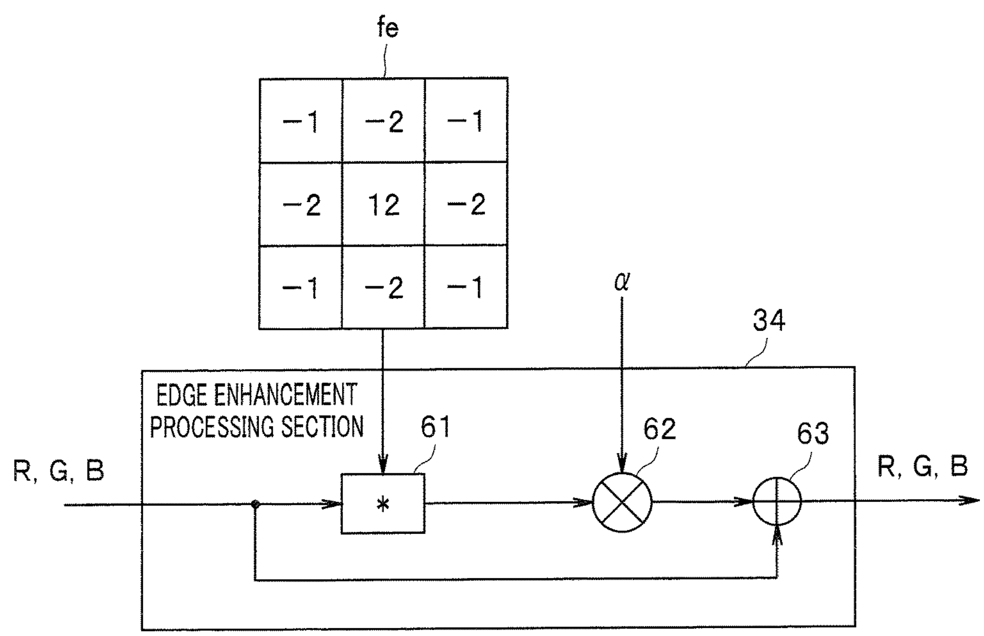
FIG. 14 is a block diagram illustrating a configuration of an edge enhancement processing section in the embodiment 1.

FIG. 14 is a block diagram illustrating a configuration of the edge enhancement processing section 34.

In an example of the configuration illustrated in FIG. 14, the edge enhancement processing section 34 includes a filter calculation section 61, a multiplication section 62, and an addition section 63.

The filter calculation section 61 extracts a pixel block of 3×3 pixels, for example, centered at a target pixel position for each of an R image, a G image, and a B image after the concurrent processing inputted from the concurrent processing section 33, and exerts an edge extraction filter fe including a matrix of three rows and three columns, as illustrated in FIG. 14, for example, on the extracted 3×3 pixels, to extract an edge component at the target pixel position.

The multiplication section 62 multiplies the edge component at the target pixel position, which has been extracted by the filter calculation section 61, by an edge enhancement parameter $\alpha$, to adjust the edge enhancement degree.

The addition section 63 performs edge enhancement by adding the edge component at the target pixel position after the adjustment, which has been outputted from the multiplication section 62, to pixel data of an original target pixel, and outputs an edge enhancement result.

Such processing is performed for all pixel positions while the target pixel position is being moved in a raster scan order, for example, to complete edge enhancement processing.

Note that, while the edge enhancement processing has been performed for each of the R image, the G image, and the B image after the concurrent processing, the edge enhancement processing may be performed for only luminance data after image data is converted into luminance-color difference data, for example.

FIG. 13 is a chart illustrating an example in which an edge enhancement parameter $\alpha$ is determined depending on a characteristic relating to a pixel opening of composite image data.

The edge enhancement processing section 34 in the image processing section 32 determines the edge enhancement parameter $\alpha$ based on a characteristic relating to a pixel opening of the composite image data generated by the synthesis processing section 31.

Figure 15:
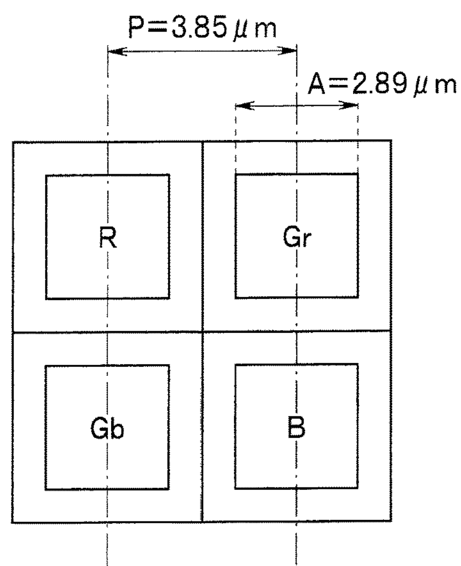
FIG. 15 is a diagram illustrating a pixel pitch P and a pixel opening width A of a normal image obtained by normal one image shooting in the embodiment 1.
Figure 16:
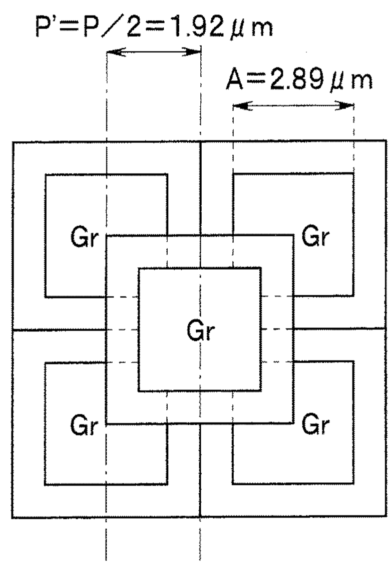
FIG. 16 is a diagram illustrating a pixel pitch P' and a pixel opening width A of a super-resolution image obtained by a pixel shift in the embodiment 1.

First, in a normal image obtained by normal one image shooting and a super-resolution image obtained by the pixel shift, as illustrated in FIG. 4, a pixel pitch (sampling pitch) changes, as illustrated in FIGS. 15 and 16. FIG. 15 is a diagram illustrating a pixel pitch P and a pixel opening width A in the normal image obtained by the normal one image shooting, and FIG. 16 is a diagram illustrating a pixel pitch P' and a pixel opening width A in the super-resolution image obtained by the pixel shift.

In the example illustrated in FIG. 15, the pixel pitch P is 3.85 μm, and the pixel opening width A is 2.89 μm. Therefore, a pixel opening ratio in the normal image is as follows:

$$A/P=2.89/3.85=75\%$$

Note that the pixel opening ratio is represented by a ratio of a pixel opening length in a one-dimensional direction to a pixel opening ratio in the one-dimensional direction, i.e., a sampling pitch. However, the pixel opening ratio may be indicated by a pixel opening ratio in two dimensions, i.e., a ratio of the area of a pixel opening to an area corresponding to one pixel obtained by dividing the area of an image pickup surface by the number of pixels, like in a general definition of a pixel opening ratio.

On the other hand, when the pixel shift, as illustrated in FIG. 4, is performed for the image pickup device 22 in a pixel configuration, as illustrated in FIG. 15, the pixel pitch P' becomes 1.92 μm, which is half of the pixel pitch P illustrated in FIG. 15, as illustrated in FIG. 16. Therefore, a pixel opening ratio in the super-resolution image is as follows:

$$A/P'=2.89/1.92=150\%$$

Therefore, the pixel opening ratio exceeds 100% in the super-resolution image.

Figure 17:
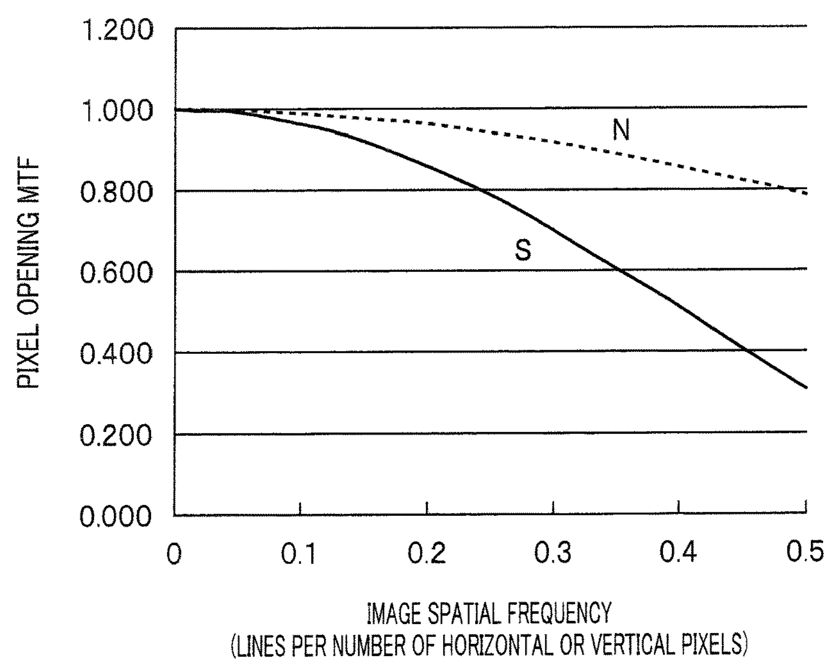
FIG. 17 is a line diagram illustrating an example of a pixel opening MTF against an image spatial frequency for a super-resolution image and a normal image in the embodiment 1.

In such a case, as illustrated in FIG. 17, a pixel opening MTF at the same image spatial frequency is made significantly lower for a super-resolution image S than that for a normal image N. FIG. 17 is a line diagram illustrating an example of a pixel opening MTF against an image spatial frequency for the super-resolution image S and the normal image N.

Letting u be an image spatial frequency and letting a be a pixel opening ratio, the pixel opening MTF is expressed by the following equation 4:

$$MTF(u)=\{\sin(a\times u\times\pi)\}/(a\times u\times\pi) \quad \text{[Equation 4]}$$

As illustrated in FIG. 17, the MTF for the super-resolution image S more greatly decreases as the image spatial frequency increases than the MTF for the normal image N. Therefore, image contrast is found to have decreased. As a specific example, the pixel opening MTF at an image spatial frequency of 0.3 (lines per the number of horizontal or vertical pixels) is approximately 0.9 (90%) for the normal image N while being approximately 0.7 (70%) for the super-resolution image S. Thus, the pixel opening MTF for the super-resolution image S has more significantly decreased.

Therefore, in the present embodiment, an edge enhancement parameter α is changed depending on a characteristic relating to a pixel opening of composite image data, as illustrated as an example in FIG. 13.

That is, the edge enhancement processing section 34 determines the edge enhancement parameter α as 0.1 when the pixel opening ratio is 75% (or the pixel opening MTF at an image spatial frequency of 0.3 (lines per the number of horizontal or vertical pixels) is 0.9) while determining the edge enhancement parameter α as 0.45 when the pixel opening ratio is 150% (or the pixel opening MTF at an image spatial frequency of 0.3 (lines per the number of horizontal or vertical pixels) is 0.7).

While the pixel opening ratio or the pixel opening MTF characteristic is taken as an example of a characteristic relating to a pixel opening of composite image data in FIG. 13, the present invention is not limited to the example. As described above, the edge enhancement parameter α may be determined depending on a shooting mode, as described above.

Thus, the edge enhancement processing section 34 performs edge enhancement processing for the image data (normal image data or composite image data) using the determined edge enhancement parameter α.

Figure 18:
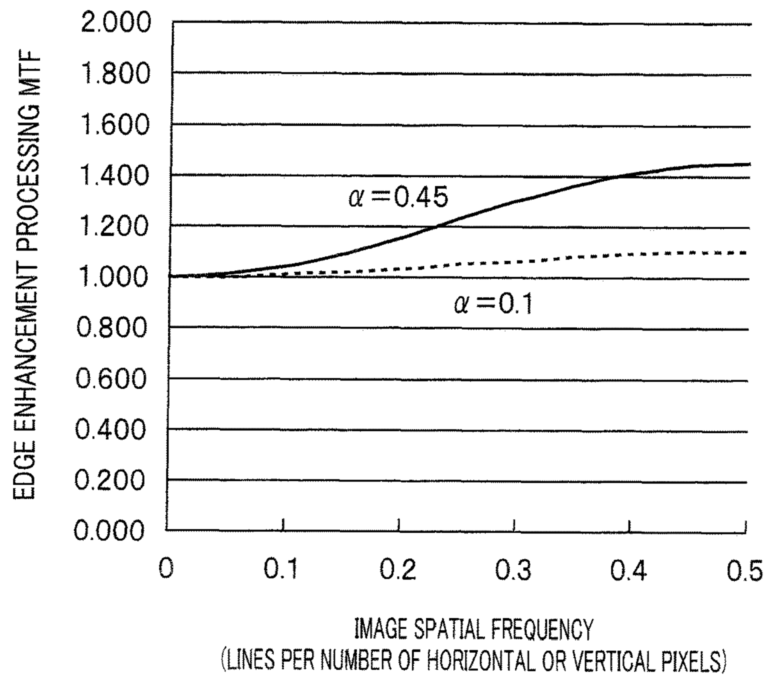
FIG. 18 is a line diagram illustrating an example of an edge enhancement processing MTF against an image spatial frequency in the embodiment 1.

FIG. 18 is a line diagram illustrating an example of an edge enhancement processing MTF against an image spatial frequency.

When edge enhancement processing is performed using an edge enhancement parameter α, the edge enhancement processing MTF increases as the image spatial frequency increases. However, when a value of the edge enhancement parameter α is large, a higher increase rate is shown. More specifically, in the example illustrated in FIG. 18, when the image spatial frequency is zero, the edge enhancement processing MTF is 1.0 for both α=0.45 and α=0.1. However, as the image spatial frequency increases, the edge enhancement processing MTF for α=0.45 takes a value higher than the value of the edge enhancement processing MTF for α=0.1.

Figure 19:
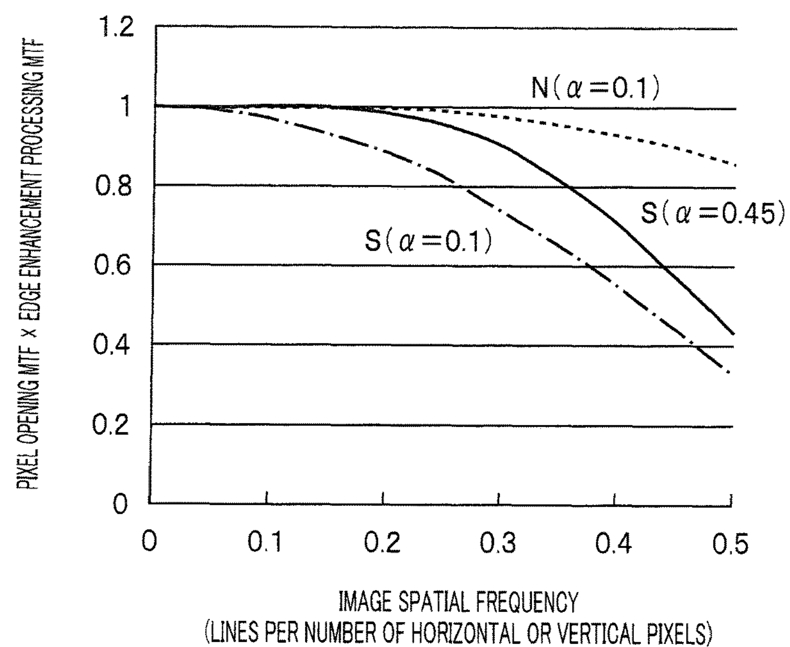
FIG. 19 is a line diagram illustrating an example of a pixel opening MTF×an edge enhancement processing MTF against an image spatial frequency in the embodiment 1.

The MTF for the entire system is represented by multiplication of respective MTFs for sections constituting the system. Therefore, when the pixel opening MTF as illustrated in FIG. 17 is multiplied by the edge enhancement processing MTF as illustrated in FIG. 18, an MTF as illustrated in FIG. 19 is obtained. FIG. 19 is a line diagram illustrating an example of a pixel opening MTF×an edge enhancement processing MTF against an image spatial frequency.

When edge enhancement processing for α=0.1 is performed, the MTF is somewhat improved (and thus, the sharpness is somewhat improved) for both a normal image N and a super-resolution image S, as can be seen from comparison between FIG. 17 and FIG. 19. However, when the edge enhancement parameter α is made larger than 0.1 for the normal image N, the MTF may exceed 1. Therefore, excess edge enhancement is considered to occur. On the other hand, room still exists for improvement in the MTF for the super-resolution image S.

Therefore, edge enhancement processing for α=0.45 (i.e., slightly stronger edge enhancement processing than the edge enhancement processing for the normal image N) is performed for the super-resolution image S. In this case, the MTF for the super-resolution image S takes a value of 1, which is almost comparable to the MTF for the normal image N at an image spatial frequency of 0 to 0.2 (lines per the number of horizontal or vertical pixels), and the MTF is more significantly improved than when the edge enhancement processing for α=0.1 is performed even if the image spatial frequency exceeds 0.2 (lines per the number of horizontal or vertical pixels). Therefore, a more preferable resolution feeling is found to be obtained.

However, when an edge enhancement degree is increased, noise is also amplified. However, an S/N (signal-to-noise ratio) is improved using an average value of a Gr component and a Gb component for a G component, as described above. Thus, an amount of noise amplification by edge enhancement can be canceled to some extent.

What value is to be taken as the edge enhancement parameter α differs depending on a characteristic relating to a pixel opening of composite image data. Therefore, the edge enhancement processing section 34 determines the edge enhancement parameter α, as illustrated in FIG. 20 or 21, for example.

Figure 20:
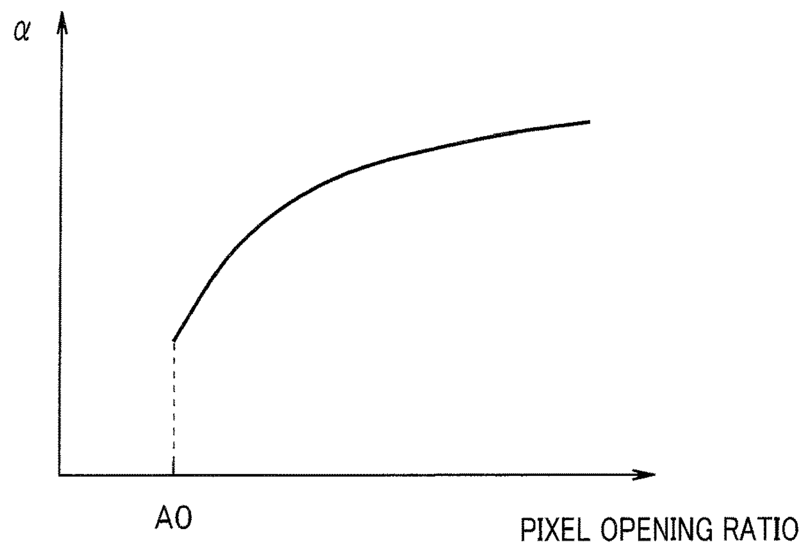
FIG. 20 is a line diagram illustrating an example in which an edge enhancement parameter $\alpha$ is determined depending on a pixel opening ratio in the embodiment 1.

First, FIG. 20 is a line diagram illustrating an example in which an edge enhancement parameter α is determined depending on a pixel opening ratio.

If the pixel opening ratio is used as a characteristic relating to a pixel opening of composite image data, the edge enhancement processing section 34 determines the edge enhancement parameter α to monotonously increase as the pixel opening ratio increases from an initial value A0.

Figure 21:
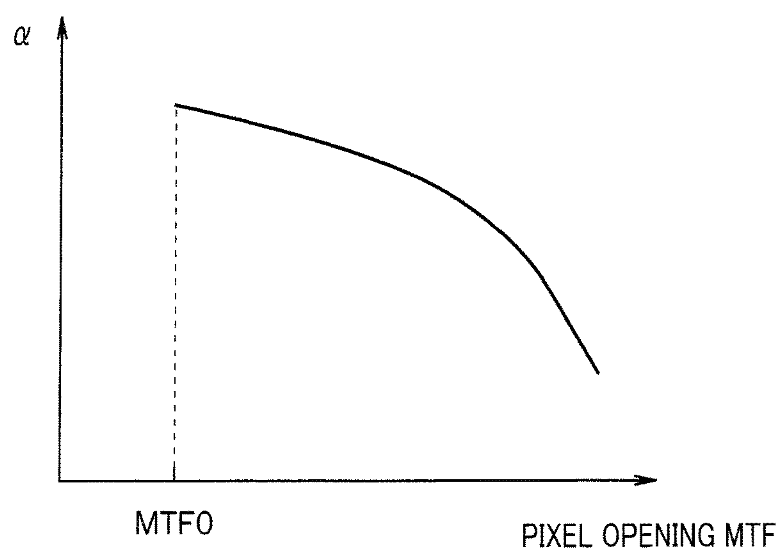
FIG. 21 is a line diagram illustrating an example in which an edge enhancement parameter $\alpha$ is determined depending on a pixel opening MTF in the embodiment 1.

FIG. 21 is a line diagram illustrating an example in which an edge enhancement parameter α is determined depending on a pixel opening MTF.

If the pixel opening MTF characteristic is used as a characteristic relating to a pixel opening of composite image data, the edge enhancement processing section 34 determines the edge enhancement parameter α to monotonously decrease as the pixel opening MTF characteristic increases from an initial value MTF0.

Note that the edge enhancement processing has been performed within the digital camera serving as the image pickup apparatus, as described above. However, the present invention is not limited to this. For example, the aforementioned edge enhancement processing may be performed by recording a characteristic relating to a pixel opening of composite image data on the recording medium 42 in relation to the composite image data and reading the composite image data recorded on the recording medium 42 and the characteristic relating to the pixel opening of the composite image data using an external apparatus such as a personal computer, to execute an image processing program on a personal computer. Alternatively, image synthesis processing and edge enhancement processing may be performed using an external apparatus by recording a plurality of (eight in the aforementioned example) pieces of RAW image data, which cause a composite image to be generated, a movement amount in a pixel shift, and a characteristic relating to a pixel opening instead of recording the composite image and the characteristic relating to the pixel opening.

According to the embodiment 1, an edge enhancement parameter is determined based on a characteristic relating to a pixel opening of composite image data, and edge enhancement processing is performed for the composite image data using the determined edge enhancement parameter. Therefore, when a composite image is obtained from a plurality of images obtained by a pixel shift, a composite image having a high sharpness can be generated by reducing deterioration in resolution due to an influence of the pixel opening.

If a characteristic relating to a pixel opening of composite image data is recorded on the recording medium 42 or the like in relation to the composite image data, an edge enhancement parameter is determined based on the characteristic relating to the pixel opening of the composite image data in an external apparatus such as a computer. Edge enhancement processing can be performed for the composite image data using the determined edge enhancement parameter. Also in this case, a composite image having a high sharpness can be generated by reducing deterioration in resolution due to an influence of the pixel opening, like when edge enhancement processing is performed within a digital camera.

Furthermore, when a pixel opening ratio is used as a characteristic relating to a pixel opening, and an edge enhancement parameter $\alpha$ is determined to monotonously increase as the pixel opening ratio increases, a composite image having a higher sharpness depending on a value of the pixel opening ratio can be obtained.

On the other hand, when a pixel opening MTF characteristic is used as a characteristic relating to a pixel opening, and an edge enhancement parameter $\alpha$ is determined to monotonously decrease as the pixel opening MTF characteristic increases, a composite image having a higher sharpness depending on a value of the pixel opening MTF characteristic can be obtained.

The shift mechanism 23 sets a plurality of relative positions so that respective positions of different pixels corresponding to a color filter in a luminance corresponding color overlap each other at at least two of the plurality of relative positions. Therefore, image quality enhancement can be achieved appropriately using any of the plurality of pixels which overlap one another (i.e., using only appropriate pixel values, except for pixel values considered to be inappropriate), or pixel values can be made appropriate using two or more of the plurality of pixels which overlap one another (e.g., by taking a value such as an average value or a median value), and thus image quality enhancement can be achieved.

At this time, the synthesis processing section 31 can improve an S/N ratio using simple calculation by averaging a plurality of pieces of pixel data in a luminance corresponding color acquired at overlapping positions to obtain pixel data after synthesis at overlapping positions, and can reliably obtain a composite image the quality of which is enhanced by canceling an increase in noise by edge enhancement processing.

Embodiment 2

Figure 22:
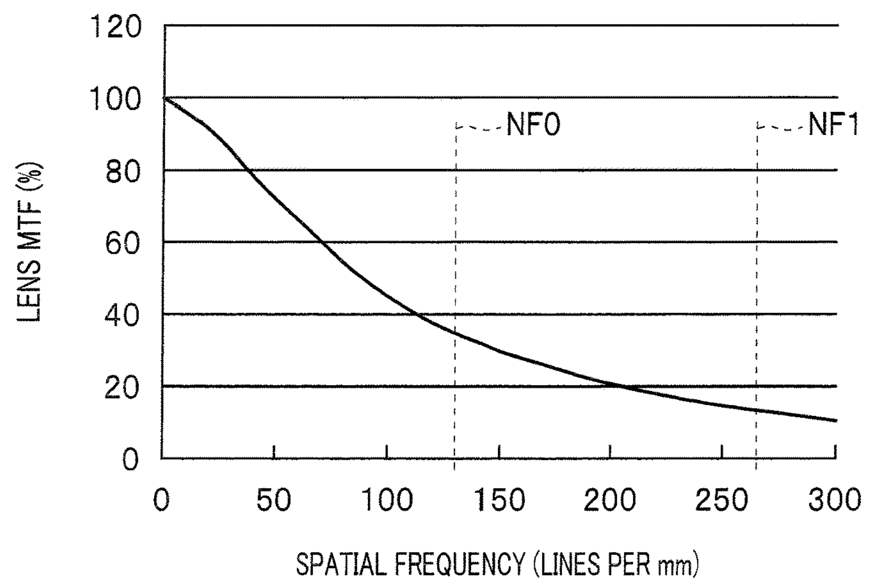
FIG. 22 is a line diagram illustrating an example of a lens MTF against a spatial frequency in an embodiment 2 of the present invention.
Figure 23:
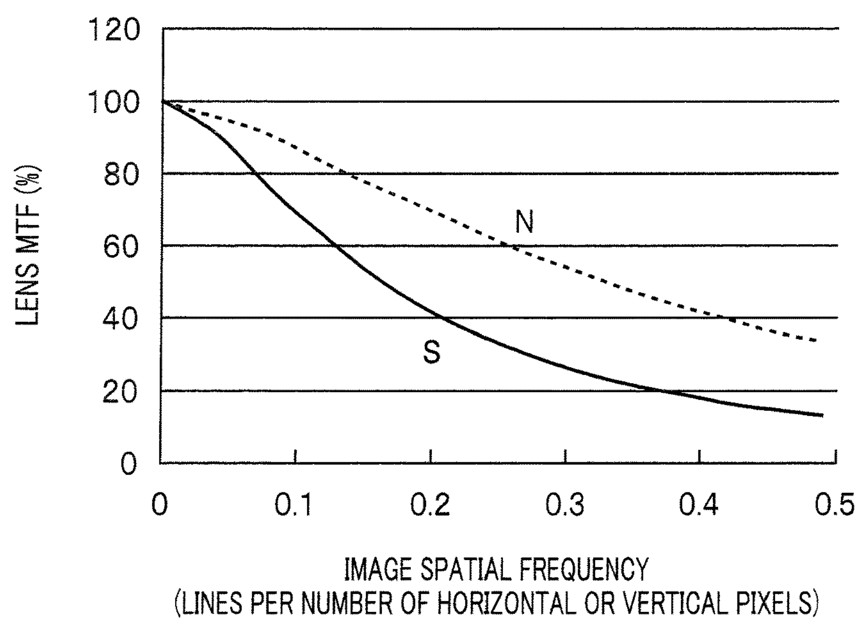
FIG. 23 is a line diagram obtained by converting the lens MTF illustrated in FIG. 22 so that a horizontal axis represents an image spatial frequency in the embodiment 2.
Figure 24:
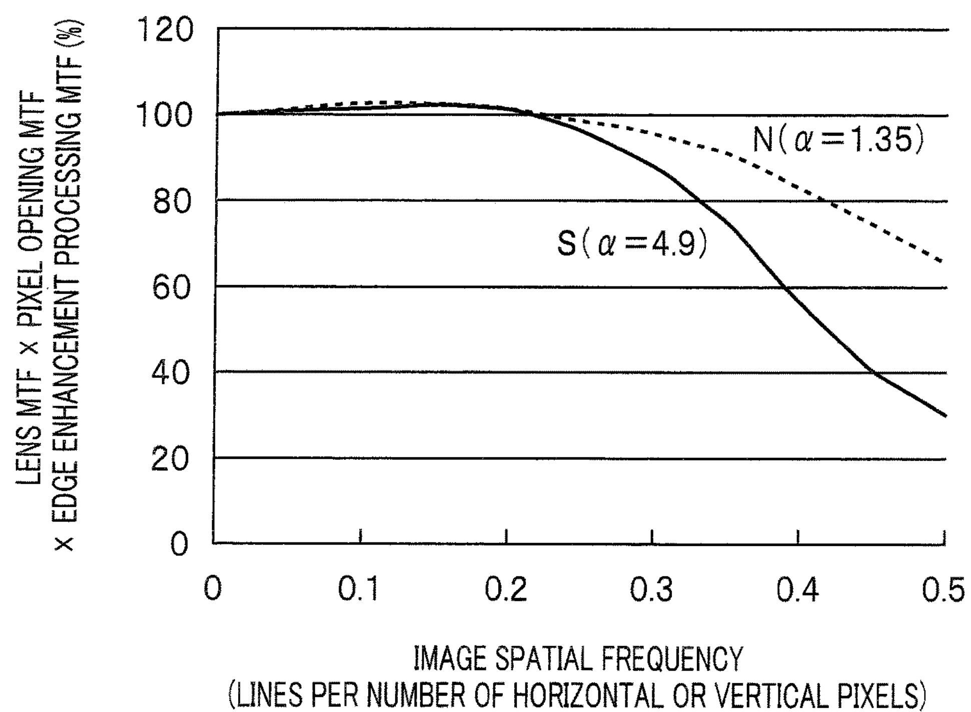
FIG. 24 is a line diagram illustrating an example of a lens MTF×a pixel opening MTF×an edge enhancement processing MTF against an image spatial frequency in the embodiment 2.

FIGS. 22 to 24 illustrate an embodiment 2 of the present invention, where FIG. 22 is a line diagram illustrating an example of a lens MTF against a spatial frequency. In FIG. 22, (lines per millimeter) is used as a unit of the spatial frequency.

In the embodiment 2, components similar to components in the aforementioned embodiment 1 are assigned the same reference numerals, and hence description of the components is omitted, as needed, and only different components will be mainly described.

In the aforementioned embodiment 1, the edge enhancement processing section 34 determines the edge enhancement parameter $\alpha$ based on the pixel opening MTF characteristic of the composite image data. On the other hand, in the embodiment 2, an edge enhancement processing section 34 determines an edge enhancement parameter $\alpha$ based not on only a pixel opening MTF characteristic of composite image data but also on an MTF characteristic of a lens 11 used for image pickup.

A lens MTF illustrated in FIG. 22 is 100% at a spatial frequency of 0, and monotonously decreases as the spatial frequency increases. The lens MTF is approximately 35% at a Nyquist frequency NF0 of a normal image (a spatial frequency of approximately 130 (lines per millimeter) in an example illustrated in FIG. 22) and is approximately 15% at a Nyquist frequency NF1 of a super-resolution image (a spatial frequency of approximately 260 (lines per millimeter) in the example illustrated in FIG. 22).

If optical characteristics of the lens 11 include deterioration in MTF, as illustrated in FIG. 22, an MTF characteristic, which appears in an image, differs depending on a difference in sampling frequency between a normal image N and a super-resolution image S.

FIG. 23 is a line diagram obtained by converting the lens MTF illustrated in FIG. 22 so that a horizontal axis represents an image spatial frequency.

At the same image spatial frequency, except for an image spatial frequency of zero, the lens MTF for the normal image N takes a value larger than the value of the lens MTF for the super-resolution image S. In such a case, not only the pixel opening MTF but also the lens MTF needs to be considered.

FIG. 24 is a line diagram illustrating an example of a lens MTF×a pixel opening MTF×an edge enhancement processing MTF against an image spatial frequency.

In an example illustrated in FIG. 24, an edge enhancement parameter $\alpha$ is selected so that the lens MTF×the pixel opening MTF×the edge enhancement processing MTF is optimized (i.e., an MTF nearly equal to 100% is obtained at an image spatial frequency in a range which is as wide as possible), and more specifically, the edge enhancement processing section 34 determines $\alpha=1.35$ for the normal image N and determines $\alpha=4.9$ for the super-resolution image S.

Thus, a composite image obtained by synthesizing a plurality of images obtained by image pickup is also affected by the lens 11 used for the image pickup. Therefore, when the lens MTF is further considered, the sharpness can be more appropriately enhanced.

Note that the lens MTF characteristic differs for each lens model number (or furthermore, for each lens individual) when not a fixed lens but the interchangeable lens 1 as illustrated in FIG. 1 is used. In addition, the lens MTF characteristic differs depending on a shooting condition (a zoom position, a diaphragm value of a diaphragm 12, etc.). Thus, when the edge enhancement parameter $\alpha$ is determined, all the conditions are preferably considered. That is, the edge enhancement parameter $\alpha$ stored in a flash memory 44 may be stored as a table respectively using a characteristic relating to an opening of a pixel, a lens MTF, a zoom position, a diaphragm value, and the like as parameters, a mathematical expression, or the like.

In the present embodiment, when an external apparatus such as a personal computer performs edge enhancement processing, the lens MTF characteristic is further recorded on a recording medium 42 in relation to composite image data or a plurality of pieces of RAW image data.

Thus, according to the embodiment 2, an almost similar effect to the effect in the aforementioned embodiment 1 is produced while the edge enhancement processing section 34 determines the edge enhancement parameter $\alpha$ based on a characteristic relating to a pixel opening of composite image data and further based on the lens MTF characteristic used for image pickup. Therefore, a high-quality composite image the sharpness of which is more enhanced can be obtained.

Note that the image pickup apparatus has been mainly described above. However, the present invention may be an image processing method for performing processing similar to the processing of the aforementioned image pickup apparatus, an image processing program for causing a computer to perform the image processing method, a computer readable and non-transitory recording medium configured to record the image processing program, and the like.

The present invention is not exactly limited to the aforementioned embodiments but components can be transformed and embodied without departing from the scope of the invention in an implementation stage. Various aspects of the invention can be formed by an appropriate combination of a plurality of components disclosed in the aforementioned embodiments. For example, some of all the components illustrated in the embodiments may be eliminated. Furthermore, the components over the different embodiments may be combined, as needed. Thus, it should be understood, of course, that various modifications and applications can be made without departing from the spirit of the invention.

What is claimed is:

1. An image pickup apparatus comprising:

an image pickup device including a plurality of pixels arrayed in a two-dimensional form at a predetermined pixel pitch;

a shooting mode setting section configured to set either one of a first shooting mode and a second shooting mode;

a pixel shift section configured to, when the second shooting mode is set, perform a pixel shift so that a relative position in a direction of the array in the two-dimensional form between the image pickup device and a light flux received by the image pickup device becomes a plurality of relative positions, which differ in movement amounts, including a relative position in a movement amount which is a non-integral multiple of the pixel pitch;

an image pickup control section configured to, when the first shooting mode is set, cause the image pickup device to perform an image pickup operation once to acquire one piece of image data, and when the second shooting mode is set, cause the image pickup device to perform the image pickup operation at the plurality of respective relative positions to acquire a plurality of pieces of image data;

an image synthesis section configured to synthesize the plurality of pieces of image data acquired by the image pickup control section when the second shooting mode is set, to generate composite image data with a higher resolution than resolution of image data obtained from the image pickup device;

a parameter determining section configured to, when the first shooting mode is set, determine a first parameter as an edge enhancement parameter, and when the second shooting mode is set, determine, as the edge enhancement parameter, a second parameter that provides a degree of edge enhancement higher than a degree of edge enhancement when the first parameter is used; and an image processing section configured to use the edge enhancement parameter determined by the parameter determining section, to perform edge enhancement processing for the one piece of image data when the first shooting mode is set, and to perform the edge enhancement processing for the composite image data when the second shooting mode is set.

2. The image pickup apparatus according to claim 1, wherein the parameter determining section determines, as the edge enhancement parameter, the second parameter that compensates for an amount of decrease in pixel opening MTF characteristic caused by a pixel opening ratio becoming larger when the second shooting mode is set than when the first shooting mode is set.

3. The image pickup apparatus according to claim 1, further comprising a memory configured to store the first parameter and the second parameter, wherein the parameter determining section, when the first shooting mode is set, receives an input of the first parameter from the memory and determines the first parameter as the edge enhancement parameter, and when the second shooting mode is set, receives an input of the second parameter from the memory and determines the second parameter as the edge enhancement parameter.

4. An image processing method for processing one piece of image data acquired, when a first shooting mode is set, by an image pickup device performing an image pickup operation once, the image pickup device including a plurality of pixels arrayed in a two-dimensional form at a predetermined pixel pitch, or a plurality of pieces of image data acquired, when the second shooting mode is set, by performing a pixel shift so that a relative position in a direction of the array in the two-dimensional form between the image pickup device and a light flux received by the image pickup device becomes a plurality of relative positions, which differ in movement amounts, including a relative position in a movement amount which is a non-integral multiple of the pixel pitch, and causing the image pickup device to perform the image pickup operation at the plurality of respective relative positions, the method comprising:

for the one piece of image data acquired when the first shooting mode is set, determining a first parameter as an edge enhancement parameter, and performing edge enhancement processing for the one piece of image data using the edge enhancement parameter, for the plurality of image data acquired when the second shooting mode is set, synthesizing the plurality of pieces of image data to generate composite image data with a higher resolution than resolution of image data obtained from the image pickup device, determining, as the edge enhancement parameter, a second parameter that provides a degree of edge enhancement higher than a degree of edge enhancement when the first parameter is used; and performing the edge enhancement processing for the composite image data using the edge enhancement parameter.

* * * * *